United States Patent Office 3,769,436
Patented Oct. 30, 1973

---

3,769,436
COMPOSITIONS AND METHODS FOR THE
TREATMENT OF HYPERLIPEMIA
Louis Lafon, 5 Rue de l'Alboni,
Paris 16 ème, France
No Drawing. Continuation-in-part of abandoned application Ser. No. 60,731, Aug. 3, 1970. This application Oct. 7, 1971, Ser. No. 187,539
Claims priority, application Great Britain, Aug. 8, 1969, 39,894/69
Int. Cl. A61k 27/00
U.S. Cl. 424—337         11 Claims

ABSTRACT OF THE DISCLOSURE

Compounds of the formula

Z—CH$_2$—X—A—X—CH$_2$Z in which X is oxygen, sulfur, sulfinyl, sulfonyl or imino, A is 2-hydroxypropylene, alkylene of 5 to 10 carbon atoms, phenylene, biphenylene or naphthylene and Z is hydroxymethylene, carboxy or carbo(lower alkoxy) are normolipemic agents useful in the treatment of hyperlipemia. Pharmaceutical compositions utilizing such compounds and their method of use are disclosed. A typical embodiment is the use of 1,10-bis(2-hydroxyethylthio) decane.

---

CROSS REFERENCE

This is a continuation-in-part of Ser. No. 60,731 filed Aug. 3, 1970, now abandoned.

DETAILED DESCRIPTION

The present invention relates to medicaments particularly useful as normolipemiant agents, comprising at least one compound of the formula:

Z—CH$_2$—X—A—X—CH$_2$—Z    (I)

wherein X is O, NH, S, SO or SO$_2$, A is an alkylene radical containing 5 to 10 carbon atoms, 2-hydroxy-propylene, phenylene, biphenylene and naphthylene, and Z is hydroxymethylene, carboxy or carbo(lower alkoxy).

Compounds of the above formula have action on lipid metabolism and are therefore useful as normolipemiant agents in the treatment of diseases involving metabolic disturbances, as for example arteriosclerosis and coronary artery disorders. In particular the compounds are effective in treating hyperlipemia.

Pharmaceutical compositions incorporating one or more of these compounds in pharmaceutically-acceptable diluents or carriers are thus provided to be administered orally or parenterally to patients in a form suitable for poviding an immediate or a delayed effect.

Suitable daily doses range from 0.5 to 5 g., depending upon the compound utilized, the method of administration, the condition, age and size of the patient, and the response which is sought.

Pharmaceutical compositions can include, in addition to the above compounds, one or more other medicaments having action on lipid metabolism or on vascular disorders such as vitamins, choline, inositol, amino acids and the like.

The compounds of Formula I in which X is O or NH can be prepared by reacting a compound, HX—A—XH, with two molar equivalents of a monohaloacetic acid or a monohaloacetate in the presence of aqueous caustic soda, or in a solvent medium in the presence of potassium carbonate, at the boiling point of the reaction medium.

The compounds of Formula I in which X is S can be prepared by reacting a halo-A-halo dihalide with two molar equivalents of mercaptoacetic acid or β-mercaptoethanol in the presence of aqueous caustic soda optionally in an ethanolic medium, at the boiling temperature of the reaction medium. If desired, the compound in which X is S is transfored into the corresponding sulfinyl or sulfonyl derivative by oxidation, as for example by means of hydrogen peroxide in an acetic reaction medium.

The invention is illustrated by the following nonlimitative examples.

EXAMPLE 1 p-Phenylenedioxy diacetic acid

HOOC—CH$_2$—O—⟨phenylene⟩—O—CH$_2$—COOH 41.6 g. (0.44 mole) of monochloroacetic acid, 90 ml. of a 40% aqueous caustic soda solution, 500 ml. of water and 22 g. (0.20 mole) of hydroquinone were introduced into a 1 liter flask. The reaction mixture was heated and maintained at the boiling point for 15 minutes. It was then treated with active charcoal and the solution cooled and then acidified. The p-phenylenedioxy diacetic acid which formed and precipitated was recovered by filtration.

After drying, the product obtained in a yield of 69% (31.2 g.) had the form of a fine, a clear-beige powder, the instantaneous melting point of which was 255°–256° C. It is insoluble in water, ethanol, ethyl ether and benzene and soluble in aqueous alkaline solutions.

EXAMPLE 2

1,5-bis(carbethoxymethoxy)naphtholene

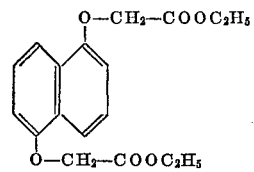

8 g. (0.05 mole) of 1,5-dihydroxynaphthalene, 16.7 g. (0.10 mole) of ethyl bromoacetate, 16.6 g. (0.1 mole) of potassium iodide, 13.8 g. (0.1 mole) of potassium carbonate and 200 ml. of acetone were introduced into a 500 ml. flask. The reaction mixture was agitated rapidly and heated. The mixture was maintained at the boiling point until the end of the evolution of gas. After cooling, the solvent was eliminated and then the residue was taken up in water and methylene chloride.

The chloromethylene solution, after being washed with a 5% aqueous caustic soda solution and then with water to neutrality, was dried over anhydrous sodium sulfate and then filtered and evaporated. The crude 1,5-bis(carbethoxymethoxy)naphthalene [alternatively named as ethyl (naphthalene-1,5-dioxy)-diacetate] thus isolated was purified by crystallization from ethyl acetate. The product, obtained in a yield of 60% (10 g.), had the appearance of a fine yellow powder having an instantaneous melting point of 133°–134° C. and is insoluble in water, ethanol, ethyl ether and benzene.

EXAMPLE 3

4,4'-bis(carbethoxymethylene)biphenyl

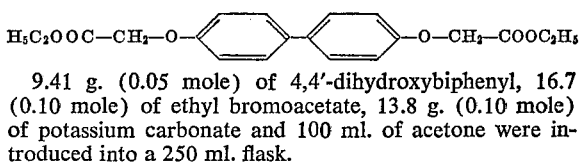

H$_5$C$_2$OOC—CH$_2$—O—⟨biphenyl⟩—O—CH$_2$—COOC$_2$H$_5$ 9.41 g. (0.05 mole) of 4,4'-dihydroxybiphenyl, 16.7 (0.10 mole) of ethyl bromoacetate, 13.8 g. (0.10 mole) of potassium carbonate and 100 ml. of acetone were introduced into a 250 ml. flask.

The reaction mixture was heated and held at the boiling point for approximately 8 hours. After cooling, the solvent was evaporated under reduced pressure. The pasty residue was taken up in water and the product, alternatively named 4,4'-dioxybiphenylene diethyl diacetate, was taken up in methylene chloride. The chloromethylene solution was washed with a 5% aqueous caustic soda solution and then with water to neutrality, dried over anhydrous sodium sulfate, filtered and then evaporated.

The product, obtained in a yield of 69.8% (12.5 g.), had the appearance of a white crystalline powder, the instantaneous melting point of which is 130°–131° C., and it is soluble in methylene chloride and in benzene and is insoluble in water, ethanol and ethyl ether.

EXAMPLE 4 p-Phenylenediamine-N,N'-diacetic acid

18 g. (0.19 mole) of monochloroacetic acid in solution in 50 ml. of water was introduced into a 250 ml. flask, followed by a solution of 8.25 g. (0.21 mole) of caustic soda in 10 ml. of water. Then 10 g. (0.09 mole) of p-phenylenediamine was added and the mixture was heated to maintain it at the boiling point for about 5 minutes. After cooling, the crude product, alternatively named as N,N'-(paraphenylene-diamine)-diacetic acid, which precipitated was recovered by filtration. It was purified by crystallization from water.

The product, obtained in a yield of 54.4% (9.4 g.), had the appearance of a beige crystalline powder, having an instantaneous melting point of 222°–228° C., and is soluble in dilute aqueous acid and alkaline solutions and is insoluble in water, ethanol, ethyl ether and benzene.

EXAMPLE 5

1,5-bis(β-hydroxyethylthio)-pentane

69 g. (0.30 mole) of 1,5-dibromopentane, 51.6 g. (0.66 mole) of 2-mercaptoethanol were introduced into a 500 ml. flask and then 67 ml. of a 40% aqueous caustic soda solution was added. The temperature rose. The mixture was then heated to the boiling point for 2 hours. After cooling, the mixture was taken up in water and the 1,5-bis(β-hydroxyethylthio)pentane which formed was extracted with ethyl ether. The ethereal solution was washed with water, dried over anhydrous sodium sulfate, filtered and evaporated.

The product, obtained in a yield of 63.6% (42.7 g.), had the appearance of a clear yellow oil which, on cooling, formed crystals having a melting point of 25°–30° C.; the product is soluble in ethanol, ethyl ether and benzene and insoluble in water.

EXAMPLE 6

1,10-bis(β-hydroxyethylthio)decane

30 g. (0.10 mole) of 1,10-dibromodecane, 17.2 g. (0.22 mole) of 2-mercaptoethanol and 50 ml. of ethanol were introduced into a 250 ml. flask. Then, 22 ml. of a 40% aqueous caustic soda solution was slowly added. The temperature rose progressively during the operation and reached the boiling point of the solvent, where it was then maintained for about 1 hour. After cooling, the solvent was evaporated under reduced pressure and the residue was taken up in water and methylene chloride. The chloromethylene solution was washed with water, dried over anhydrous sodium sulfate, filtered and then evaporated.

The crude 1,10-bis(β-hydroxyethylthio)decane thus isolated was purified by crystallization from a water/methanol mixture.

The product, obtained in a yield of 98.3% (29 g.), had the appearance of a white, yellow-reflecting crystalline powder, having an instantaneous melting point of 70°–71° C., and is soluble in ethanol and insoluble in water, ethyl ether and benzene.

EXAMPLE 7

1,10-bis(β-hydroxyethylsulfinyl)decane

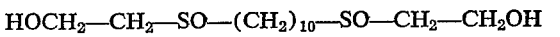

14.7 g. (0.05 mole) of 1,10-bis(β-hydroxyethylthio) decane described in Example 6 was dissolved in 150 ml. of acetic acid in a 250 ml. phial. Then 9.75 ml. of 30% hydrogen peroxide was added. The temperature rose to 40° C. It was allowed to return to ambient temperature and agitation was effected for 24 hours. The solvent was then evaporated and the pasty residue was taken up in isopropyl ether.

After filtration and drying, the product obtained in a yield of 75% (12.2 g.) had the appearance of a white yellow-reflecting powder, the instantaneous melting point of which was 111°–112° C., and it is soluble in ethanol and water and is insoluble in ethyl ether and benzene.

EXAMPLE 8

1,10-bis(β-hydroxyethylsulfonyl)decane

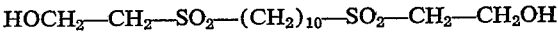

14.7 g. (0.05 mole) of 1,10-bis(β-hydroxyethylthio) decane and 150 ml. of acetic acid were introduced into a 250 ml. flask. After dissolution, 25 ml. of 30% hydrogen peroxide was added and the mixture was heated for 16 hours at approximately 60° C. After cooling, the mixture was filtered.

The product, obtained in a yield of 36% (6.45 g.), had the appearance of a white crystalline powder, the instantaneous melting point of which was 109°–110° C., and it is insoluble in water, ethanol, ethyl ether and benzene.

EXAMPLE 9

1,3-bis(carboxymethylthio)propanol-2

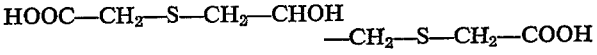

12.9 (0.10 mole) of 1,3-dichloropropanol-2, 21.3 g. (0.22 mole) of thioglycolic acid and 100 ml. of ethanol were introduced into a 500 ml. flask. Then 44 ml. of a 40% aqueous caustic soda solution was slowly added. The temperature rose. The mixture was allowed to cool, the solvent was evaporated and the residue was taken up in water, which was then washed with ethyl ether. The aqueous solution was treated with vegetable charcoal and then acidified by the addition of hydrochloric acid and extracted with ethyl ether. The ethereal solution was dried over anhydrous sodium sulfate, filtered and then evaporated.

The product, obtained in a yield of 46% (10.8 g.), had the appearance of a pale yellow oil which was soluble in ethanol, ethyl ether, benzene and aqueous alkaline solutions and is insoluble in water.

EXAMPLE 10

1,5-dithiopentane diacetic acid

23 g. (0.10 mole) of 1,5-dibromopentane, 21.3 g. (0.22 mole) of thioglycolic acid and 100 ml. of ethanol were introduced into a 500 ml. flask. Then 44 ml. of a 40% aqueous caustic soda solution was added. The temperature rose. It was then allowed to cool. The reaction medium was washed with ethyl ether. The aqueous solution was acidified with hydrochloric acid and then extracted with ethyl ether to obtain the 1,5-dithiopentane diacetic acid which formed. The ethereal solution, after being washed with water, was dried over anhydrous sodium sulfate, filtered and then evaporated.

The product, obtained in a yield of 89.5% (22.9 g.), had the appearance of a white powder, the instantaneous melting point of which was around 85° C., and it is a soluble in ethanol, ethyl ether and aqueous alkaline solutions and is insoluble in water and in benzene.

EXAMPLE 11
Tablet

| Ingredient: | Amount per tablet, g. |
|---|---|
| 1,10-bis(2-hydroxyethylthio)decane | 0.400 |
| Microcrystalline cellulose | 0.068 |
| Sodium salt of saccharin | 0.0008 |
| Starch | Q.s. |
| Magnesium stearate | Q.s. |

The foregoing materials were compounded and pressed into 0.59 tablets.

EXAMPLE 12
Dragées

Dragées cores were prepared from the following ingredients:

| Core: | Amount per core, g. |
|---|---|
| 1,10-bis(β-hydroxyethylsulfinyl)decane | 0.250 |
| Lactose | 0.050 |
| Sugar | 0.030 |
| Magnesium stearate | 0.003 |
| Talc | 0.002 |

These cores were then coated with the following ingredients:

| Coating: | Amount per coating, g. |
|---|---|
| Sugar | 0.165 |
| Talc | 0.070 |
| Gelatin | Trace |
| Titanium oxide | Trace |
| Wax | Trace |

The resultant dragées weigh about 0.59 g.

EXAMPLE 13
Tablet

| Ingredient: | Amount per tablet, g. |
|---|---|
| 1,10-bis(β-hydroxyethylsulfonyl)decane | 0.400 |
| Sodium salt of saccharin | 0.0008 |
| Microcrystalline cellulose | 0.068 |
| Starch | Q.s. |
| Magnesium stearate | Q.s. |

The monolipemic effects of the compounds of the present invention can be observed from the following:

Male rats, of i.e. Wistar strain, of the same stock and weighing between 150 and 200 g. were used in lots of 5 and housed in individual cages maintained at constant temperature.

Either normal food or food enriched with lipids was given ad lib, together with water and a piece of bread. Normal food (N) intended for the control animals, was constituted by biscuits of the following composition:

| | |
|---|---|
| Raw Protein | percent 24 |
| Fatty material | do 4.5 |
| Cellulosic material | do 6.5 |
| Mineral material | do 9 |
| Water | do 12 |
| Vitamin A | I.U./kg 5000 |
| Vitamin D | I.U./kg 2000 |
| Vitamin B₂ | mg./kg 5 |

Food enriched with lipids (HL) used to provoke hyperlipemia in the animals included the following:

| | Percent |
|---|---|
| Casein | 20 |
| Glucose | 10 |
| Starch | 13.4 |
| Vegetable and animal fats | 35 |
| Cellulose | 5 |
| Mineral material | 10 |
| Vitamin complex | 1 |
| Cholesterol | 4.5 |
| P.T.U. | 0.3 |

Test group No. 1 served as a normal control, received the normal diet and drinking water ad lib, as well as a small piece of bread.

Test group No. 2 was fed the hyperlipemic diet and water as desired with a piece of bread.

Test group No. 3 received the same diet as Test group No. 2 together with the test compound.

Each test lasted 15 days, after which the animals were sacrificed by jugular bleeding and the blood was collected for the following biological determinations:

(a) Total lipids were determined according to the procedure of Jobin and Yvon, Instrumental Bulletin 40 (February 1965);

(b) Total cholesterol was determined according to the technique of L. Babson and Coll. Clinica Chimica Acta, 1962;

(c) Burstein evaluation was conducted with dextran sulfate, according to the method of Badin and Coll, Ann. Biol. Clin., 1957, 469, Path. et Biol., 1958, p. 541.

The following table shows the results obtained with the representative compounds:

TABLE

| Compound | Diet | Dose, mg./kg. | Total lipids G./L. | Total lipids Percent inhib. | Cholesterol G./L. | Cholesterol Percent inhib. | Burstein test Venes degrees | Burstein test Percent inhib. |
|---|---|---|---|---|---|---|---|---|
| Example 5 | N | 0 | 5.0 | | 0.6 | | 25 | |
| | HL | 0 | 10.4 | | 2.54 | | 89 | |
| | HL | 500 | 7.2 | 59 | 1.54 | 51 | 52.5 | 56 |
| Example 6 | N | 0 | 4.03 | | 0.53 | | 27 | |
| | HL | 0 | 12.34 | | 2.31 | | 100 | |
| | HL | 125 | 6.95 | 65 | 1.24 | 61 | 50 | 69 |
| | HL | 250 | 7.26 | 62 | 1.22 | 62 | 52 | 66 |
| Example 7 | N | 0 | 3.1 | | 0.4 | | 23 | |
| | HL | 0 | 18.8 | | 3.56 | | 170 | |
| | HL | 500 | 9.0 | 65 | 1.60 | 62 | 78 | 63 |
| Example 8 | N | 0 | 3.1 | | 0.4 | | 23 | |
| | HL | 0 | 18.8 | | 3.56 | | 170 | |
| | HL | 500 | 9.6 | 58 | 1.50 | 65 | 87 | 57 |

The toxicity of the compounds is low with no toxic effects being observed in laboratory animals at oral doses as high as 3000 mg./kg. No evidence of stomach inflammation has been observed.

The compound of Example 6 was administered in the form of gelules containing 150 mg. of active ingredient to 10 classified hyperlipemic patients on adequate diets, at a dose regimen of 4 to 8 gelules per day for a period of from 3 weeks to 5 months. The composition proved to have excellent tolerance with no secondary effects. Favorable effects were observed in 7 patients (70%) with an average reduction in total lipids of about 15%, of total cholesterol of about 20%, and of the triglycerides of about 16%. Known hypolipemic products have comparable effects, e.g. on the order of a 10 to 18% reduction in total lipids and total cholesterol, in about 40 to 70% of the cases.

What is claimed is:

1. A pharmaceutical composition for the treatment of hyperlipemia comprising in solid oral unit dosage form an effective amount of a compound of the formula:

wherein

X is sulfur, sulfinyl or sulfonyl;

A is alkylene of from 5 to 10 carbon atoms; and
Z is hydroxymethylene,
and a pharmaceutical carrier.

2. The composition according to claim 1 in which said compound is 1,5-bis(β-hydroxyethylthio)pentane.

3. The composition according to claim 1 in which said compound is 1,10-bis(β-hydroxyethylthio)decane.

4. The composition according to claim 1 in which said compound is 1,10-bis(β-hydroxyethylsulfinyl)decane.

5. The composition according to claim 1 in which said compound is 1,10-bis(β-hydroxyethylsulfonyl)decane.

6. A pharmaceutical composition according to claim 1 containing 1,10-bis(β-hydroxyethylthio)decane as said compound in an amount sufficient to supply a total daily dosage of from 600 to 1200 mg. thereof upon daily oral administration of a plurality of said dosage forms.

7. The method of treating hyperlipemia which comprises orally administering to a hyperlipemic animal an effective amount of a compound of the formula:

$$Z\text{---}CH_2\text{---}X\text{---}A\text{---}X\text{---}CH_2\text{---}Z$$

wherein
X is sulfur, sulfinyl or sulfonyl;
A is alkylene of 5 to 10 carbon atoms; and
Z is hydroxymethylene.

8. The method according to claim 7 in which said compound is 1,5-bis(β-hydroxyethylthio)pentane.

9. The method according to claim 7 in which said compound is 1,10-bis(β-hydroxyethylthio)decane.

10. The method according to claim 7 in which said compound is 1,10-bis(β-hydroxyethylsulfinyl)decane.

11. The method according to claim 7 in which said compound is 1,10-bis(β-hydroxyethylsulfonyl)decane.

References Cited

Chem. Abst., vol. 55—14140–14141 (1961).
Chem. Abst., vol. 56—15082b (1962).
Chem. Abst., vol. 61—16228c (1963).

STANLEY L. FRIEDMAN, Primary Examiner

U.S. Cl. X.R.

424—311, 317, 33 Q, 339